(12) United States Patent
Lushear et al.

(10) Patent No.: US 8,355,316 B1
(45) Date of Patent: Jan. 15, 2013

(54) END-TO-END NETWORK MONITORING

(75) Inventors: Brian D. Lushear, Winter Springs, FL (US); Matthew E. Mariscal, Winter Park, FL (US); Steve D. Parrott, Clifton, VA (US); Drew A. Shinholster, Maitland, FL (US); Todd M. Szymanski, Winter Park, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 407 days.

(21) Appl. No.: 12/639,906

(22) Filed: Dec. 16, 2009

(51) Int. Cl.
*H04L 12/26* (2006.01)
(52) U.S. Cl. .................................. 370/217; 370/242
(58) Field of Classification Search .................. None
See application file for complete search history.

(56) References Cited

U.S. PATENT DOCUMENTS

| | | | |
|---|---|---|---|
| 5,825,775 A | 10/1998 | Chin et al. | |
| 5,898,826 A | 4/1999 | Pierce et al. | |
| 6,046,988 A | 4/2000 | Schenkel et al. | |
| 6,226,265 B1 | 5/2001 | Nakamichi et al. | |
| 6,393,483 B1 | 5/2002 | Latif et al. | |
| 6,570,867 B1 | 5/2003 | Robinson et al. | |
| 6,650,347 B1 | 11/2003 | Nulu et al. | |
| 6,700,967 B2 | 3/2004 | Kleinöder et al. | |
| 6,788,697 B1 | 9/2004 | Aweya et al. | |
| 6,792,273 B1 | 9/2004 | Tellinger et al. | |
| 6,813,634 B1 | 11/2004 | Ahmed | |
| 6,963,575 B1 | 11/2005 | Sistanizadeh et al. | |
| 6,973,042 B1 | 12/2005 | Fitzgerald | |
| 6,978,223 B2 | 12/2005 | Milliken | |
| 7,016,301 B1 | 3/2006 | Moore | |
| 7,099,305 B1 | 8/2006 | Fardid | |
| 7,099,912 B2 | 8/2006 | Ishizaki et al. | |
| 7,110,362 B2 | 9/2006 | Kato | |
| 7,143,152 B1 | 11/2006 | Elman | |
| 7,213,021 B2 | 5/2007 | Taguchi et al. | |
| 7,225,139 B1 | 5/2007 | Tidwell et al. | |
| 7,376,719 B1 | 5/2008 | Shafer et al. | |
| 7,376,864 B1 | 5/2008 | Hu et al. | |
| 7,424,526 B1 | 9/2008 | Hansen et al. | |

(Continued)

OTHER PUBLICATIONS

Gonzalez, Jose, et al., "Virtual Link Mapping", U.S. Appl. No. 11/746,273, filed May 9, 2007.

(Continued)

*Primary Examiner* — Min Jung

(57) ABSTRACT

A system, comprising a computer having a processor and a memory and an application stored in the memory that, when executed by the processor, identifies a plurality of routers traversed by data packets sent from a source customer edge router to a destination customer edge router, determines a performance of each of the identified routers with reference to their transport of the data packets sent from the source customer edge router sent to the destination customer edge router, identifies a configuration of the source customer edge router, determines a performance of the source customer edge router, identifies a configuration of the destination customer edge router, determines a performance of the destination customer edge router, analyzes the performance of each of the identified routers, the performance of the source customer edge router, the performance of the destination customer edge router, the configuration of the source customer edge router, and the configuration of the destination customer edge router, and based on the analysis, one of diagnoses a source of a communication problem associated with data packets sent from the source customer edge router to the destination customer edge router and recommends a change in the configuration of at least one of the source customer edge router and the destination customer edge router.

17 Claims, 3 Drawing Sheets

U.S. PATENT DOCUMENTS

| | | | |
|---|---|---|---|
| 7,464,152 B2 | 12/2008 | Ishizaki et al. | |
| 7,467,225 B2 | 12/2008 | Anerousis et al. | |
| 7,751,392 B1 | 7/2010 | Gonzalez et al. | |
| 7,830,816 B1 | 11/2010 | Gonzalez et al. | |
| 7,831,709 B1 | 11/2010 | Ham et al. | |
| 7,869,432 B1 | 1/2011 | Mollyn | |
| 7,904,533 B1 | 3/2011 | Gonzalez et al. | |
| 7,904,553 B1 | 3/2011 | Ham et al. | |
| 7,917,854 B1 | 3/2011 | Beaudoin et al. | |
| 7,940,676 B2* | 5/2011 | Griffin et al. | 370/242 |
| 7,983,174 B1* | 7/2011 | Monaghan et al. | 370/242 |
| 8,139,475 B2* | 3/2012 | Vercellone et al. | 370/216 |
| 2002/0022985 A1 | 2/2002 | Guidice et al. | |
| 2002/0078232 A1 | 6/2002 | Simpson et al. | |
| 2002/0087393 A1 | 7/2002 | Philonenko | |
| 2002/0101821 A1 | 8/2002 | Feldmann et al. | |
| 2002/0103631 A1 | 8/2002 | Feldmann et al. | |
| 2002/0103921 A1 | 8/2002 | Nair et al. | |
| 2002/0164007 A1 | 11/2002 | Henits | |
| 2002/0172148 A1 | 11/2002 | Kim et al. | |
| 2002/0181047 A1 | 12/2002 | Lauder et al. | |
| 2002/0186259 A1 | 12/2002 | Meandzija et al. | |
| 2003/0051195 A1 | 3/2003 | Bosa et al. | |
| 2003/0055972 A1 | 3/2003 | Fuller et al. | |
| 2003/0145072 A1 | 7/2003 | Lau et al. | |
| 2003/0154404 A1 | 8/2003 | Beadles et al. | |
| 2004/0006618 A1 | 1/2004 | Kasai et al. | |
| 2004/0010496 A1 | 1/2004 | Behrendt et al. | |
| 2004/0031059 A1 | 2/2004 | Bialk et al. | |
| 2004/0059781 A1 | 3/2004 | Yoakum et al. | |
| 2004/0064581 A1 | 4/2004 | Shitama et al. | |
| 2004/0071164 A1 | 4/2004 | Baum | |
| 2004/0139193 A1 | 7/2004 | Refai et al. | |
| 2004/0210621 A1 | 10/2004 | Antonellis | |
| 2004/0264484 A1 | 12/2004 | Kui et al. | |
| 2005/0022189 A1 | 1/2005 | Proulx et al. | |
| 2005/0027845 A1 | 2/2005 | Secor et al. | |
| 2005/0091482 A1 | 4/2005 | Gray et al. | |
| 2005/0094653 A1 | 5/2005 | Milburn et al. | |
| 2005/0240835 A1 | 10/2005 | Dragnea et al. | |
| 2006/0002401 A1 | 1/2006 | Mukherjee et al. | |
| 2006/0146694 A1 | 7/2006 | Hamaguchi et al. | |
| 2006/0167703 A1 | 7/2006 | Yakov | |
| 2006/0187855 A1 | 8/2006 | Booth, III et al. | |
| 2006/0215577 A1 | 9/2006 | Guichard et al. | |
| 2006/0268740 A1 | 11/2006 | Rosenberg et al. | |
| 2007/0041554 A1 | 2/2007 | Newman et al. | |
| 2007/0050497 A1 | 3/2007 | Haley et al. | |
| 2007/0053368 A1 | 3/2007 | Chang et al. | |
| 2007/0250625 A1 | 10/2007 | Titus | |
| 2007/0274285 A1 | 11/2007 | Werber et al. | |
| 2007/0280241 A1 | 12/2007 | Verma | |
| 2008/0002975 A1 | 1/2008 | Vukovic et al. | |
| 2008/0317039 A1 | 12/2008 | Satterlee et al. | |
| 2009/0067324 A1 | 3/2009 | Licardie et al. | |
| 2009/0198832 A1* | 8/2009 | Shah et al. | 709/239 |
| 2009/0201911 A1 | 8/2009 | DuPertuis et al. | |
| 2009/0222547 A1 | 9/2009 | Boylan et al. | |
| 2009/0296588 A1* | 12/2009 | Nishi et al. | 370/242 |
| 2010/0153537 A1* | 6/2010 | Wang et al. | 709/224 |
| 2010/0195489 A1 | 8/2010 | Zhou et al. | |

OTHER PUBLICATIONS

Lobo, Shane A., et al., "Service Grouping for Network Reporting," U.S. Appl. No. 12/480,681, filed Jun. 8, 2009.

Baader II, Michael Joseph, et al., "Associating Problem Tickets Based on Integrated Network and Customer Database," U.S. Appl. No. 12/546,351, filed Aug. 24, 2009.

Office Action dated Mar. 2, 2009, U.S. Appl. No. 11/551,704, filed Oct. 21, 2006.

Final Office Action dated Aug. 13, 2009, U.S. Appl. No. 11/551,704, filed Oct. 21, 2006.

Office Action (Advisory Action) dated Oct. 16, 2009, U.S. Appl. No. 11/551,704, filed Oct. 21, 2006.

Office Action dated Dec. 31, 2009, U.S. Appl. No. 11/551,704, filed Oct. 21, 2006.

Office Action dated May 20, 2010, U.S. Appl. No. 11/551,704, filed Oct. 21, 2006.

Notice of Allowance dated Oct. 28, 2010, U.S. Appl. No. 11/551,704, filed Oct. 21, 2006.

Supplemental Notice of Allowance dated Dec. 8, 2010, U.S. Appl. No. 11/551,704, filed Oct. 21, 2006.

Office Action dated Jun. 15, 2009, U.S. Appl. No. 11/620,140, filed Jan. 5, 2007.

Final Office Action dated Nov. 27, 2009, U.S. Appl. No. 11/620,140, filed Jan. 5, 2007.

Advisory Action dated Feb. 17, 2010, U.S. Appl. No. 11/620,140, filed Jan. 5, 2007.

Notice of Allowance dated Mar. 22, 2010, U.S. Appl. No. 11/620,140, filed Jan. 5, 2007.

Office Action dated May 25, 2010, U.S. Appl. No. 11/746,273, filed May 9, 2007.

Final Office Action dated Nov. 19, 2010, U.S. Appl. No. 11/746,273, filed May 9, 2007.

Advisory Action dated Feb. 10, 2011, U.S. Appl. No. 11/746,273, filed May 9, 2007.

Office Action dated Mar. 31, 2011, U.S. Appl. No. 11/746,273, filed May 9, 2007.

Office Action dated Nov. 1, 2011, U.S. Appl. No. 11/746,273, filed May 9, 2007.

Notice of Allowance dated Jun. 8, 2012, U.S. Appl. No. 11/746,273, filed May 9, 2007.

Office Action dated Apr. 3, 2009, U.S. Appl. No. 11/838,175, filed Aug. 13, 2007.

Final Office Action dated Nov. 24, 2009, U.S. Appl. No. 11/838,175, filed Aug. 13, 2007.

Advisory Action dated Mar. 24, 2010, U.S. Appl. No. 11/838,175, filed Aug. 13, 2007.

Notice of Allowance dated Aug. 2, 2010, U.S. Appl. No. 11/838,175, filed Aug. 13, 2007.

Office Action—First Action Interview Pilot Program Pre-Interview Communication dated Apr. 2, 2010, U.S. Appl. No. 12/036,289, filed Feb. 24, 2008.

Notice of Allowance dated Jul. 26, 2010, U.S. Appl. No. 12/036,289, filed Feb. 24, 2008.

Notice of Allowance dated Oct. 15, 2010, U.S. Appl. No. 12/273,537, filed Nov. 18, 2008.

Supplemental Notice of Allowance dated Nov. 12, 2010, U.S. Appl. No. 12/273,537, filed Nov. 18, 2008.

Supplemental Notice of Allowance dated Jan. 10, 2011, U.S. Appl. No. 12/273,537, filed Nov. 18, 2008.

Office Action dated Jun. 9, 2011, U.S. Appl. No. 12/480,681, filed Jun. 8, 2009.

Final Office Action dated Nov. 9, 2011, U.S. Appl. No. 12/480,681, filed Jun. 8, 2009.

Advisory Action dated Jan. 23, 2012, U.S. Appl. No. 12/480,681, filed Jun. 8, 2009.

Notice of Allowance dated Mar. 5, 2012, U.S. Appl. No. 12/480,681, filed Jun. 8, 2009.

Pre-Interview Communication dated Jun. 29, 2012, U.S. Appl. No. 12/546,351, filed Aug. 24, 2009.

"Traceroute", Wikipedia, http://en.wikipedia.org/w/index.php?title=Traceroute&printable=yes, Oct. 19, 2009, pp. 1-4, Wikipedia.org.

FAIPP Office Action dated Aug. 28, 2012, U.S. Appl. No. 12/546,351, filed on Aug. 24, 2009.

* cited by examiner

END-TO-END NETWORK MONITORING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An enterprise or business may maintain multiple offices in various locations. The business may subscribe to a communication service provider. The communication services may be defined, at least in part, by a service level agreement (SLA) that may define a class of service (CoS), a bandwidth, and other key communication parameters. A quality of service (QoS) and/or a class of service associated with the communication service may also be stated or implied in the SLA. An SLA may also define service availability, time to identify the cause of a customer-affecting malfunction, time to repair a customer affecting-malfunction, service provisioning time, and/or other metrics.

Virtual private networks (VPN) may be used by businesses to communicate confidentially within the business, between different sites, offices, or campuses, over a public communications network. VPN traffic can be carried over a public network infrastructure, such as the Internet, on top of standard protocols, or over a service provider network (SPN) with a defined SLA between the subscriber and the service provider. A VPN can send a variety of communications traffic including data, voice, video, or a combination of these and other traffic. In some cases, VPNs may be provided based on multi-protocol label switching (MPLS) techniques. While traversing the network, communications may travel via different paths through different devices, depending on the availability of a given device at a given time.

The subscriber may obtain connectivity to the Internet by subscribing to an Internet service provided by a service provider network. The service provider network may provide Internet service via a port on a router operated by the service provider network. The port on the router may be dedicated or reserved primarily or completely for the use of the subscriber. The subscriber connectivity to the Internet may be provided directly or indirectly by a single communication link from the subscriber to a port on a router. A router is an electronic device that provides connectivity between two networks and typically supports routing of data packets to other network nodes based on addresses embedded in the header of the data packets. Data packets may traverse from one site of the business to another site of the business via an almost-infinite number of paths through the Internet.

SUMMARY

In an embodiment, a system is disclosed. The system comprises a computer having a processor and a memory and an application stored in the memory that, when executed by the processor, identifies a plurality of routers traversed by data packets sent from a source customer edge router to a destination customer edge router. The system then determines a performance of each of the identified routers with reference to their transport of the data packets sent from the source customer edge router sent to the destination customer edge router. The system also identifies a configuration of the source customer edge router, determines a performance of the source customer edge router, identifies a configuration of the destination customer edge router, and determines a performance of the destination customer edge router. The system then analyzes the performance of each of the identified routers, the performance of the source customer edge router, the performance of the destination customer edge router, the configuration of the source customer edge router, and the configuration of the destination customer edge router. Based on the analysis, the system at least one of diagnoses a source of a communication problem associated with data packets sent from the source customer edge router to the destination customer edge router and recommends a change in the configuration of at least one of the source customer edge router and the destination customer edge router.

In another embodiment, a method is disclosed. The method comprises identifying a plurality of routers traversed by data packets sent from a source customer edge router to a destination customer edge router. It further comprises determining a performance of each of the routers with reference to their transport of the data packets sent from the source customer edge router to the destination customer edge router. It also identifies a configuration of the source customer edge router, determines a performance of the source customer edge router, identifies a configuration of the destination customer edge router, and determines a performance of the destination customer edge router. It then analyzes the performance of each of the identified routers, the performance of the source customer edge router, the performance of the destination customer edge router, the configuration of the source customer edge router, and the configuration of the destination customer edge router. Based on the analysis, the method at least one of diagnoses a source of a communication problem associated with data packets sent from the source customer edge router to the destination customer edge router and recommends a change in the configuration of at least one of the source customer edge routers and the destination customer edge router.

In yet another embodiment, a system is disclosed. The system comprises a computer having a processor and a memory and an application stored in the memory that, when executed by the processor, identifies a plurality of routers traversed by data packets sent from a source customer edge router to a destination customer edge router, determines a performance of each of the identified routers with reference to their transport of the data packets sent from the source customer edge router sent to the destination customer edge router at a plurality of times, builds a history of the performance of each of the identified routers, identifies a configuration of the source customer edge router, determines a performance of the source customer edge router at a plurality of times, builds a history of the performance of the source customer edge router, identifies a configuration of the destination customer edge router, determines a performance of the destination customer edge router at a plurality of times, builds a history of the performance of the destination customer edge router, analyzes the history of the performance of each of the identified routers, the history of the performance of the source customer edge router, the history of the performance of the destination customer edge router, the configuration of the source customer edge router, and the configuration of the destination customer edge router. Based on the analysis, the system at least one of diagnoses a source of a communication problem associated with data packets sent from the source customer edge router to the destination customer edge router and recommends a change in the configuration of at least one of the source customer edge router and the destination customer edge router.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A system and method are taught that provide end-to-end monitoring of a data communication system between a plurality of customer networks. While other systems and tools may be designed to look only at a single communication link or to analyze communications between two computer systems directly connected at the network layer, the present disclosure teaches analyzing end-to-end communication that may involve many network computers and/or routers. The customer networks may be at the same or different physical locations or sites. Communications, in the form of data packets, may travel between the customer networks, at least in part, via the Internet. In an embodiment, the system and method may use a system monitoring tool to characterize the devices the data packets traverse as they travel between networks. This characterization may be from a specific location at each of several customer networks, such as from/to the so-called "edge routers" at two or more of the customers' locations. In another embodiment, the system monitoring tool may use a tracing utility to identify and characterize the routers that data packets traverse when moving from one customer network to another customer network. The system monitoring tool may operate continuously or may be set to run periodically.

In an embodiment, the system monitoring tool may log information collected by the tracing utility and may then analyze the information to diagnose and/or correct communication problems between the networks. In another embodiment, the system and method may provide the customer with the ability to self-diagnose and/or correct communication issues, and may provide a customer or customers with the ability to create restrictions for their end users to filter specific ports devices, and/or features of the system and method. The system and method may also be configured to allow customers to suppress alarms and/or service ticket generation during maintenance procedures.

In an embodiment, the system and method may reduce the workload of the communication service provider and may thereby allow the communication service provider to reduce costs. The system and method may also allow the customer to determine an appropriate level or class of service to better serve the customers needs, based on analyzing communication system information provided by the system monitoring tool and the tracing utility.

Figure 1:
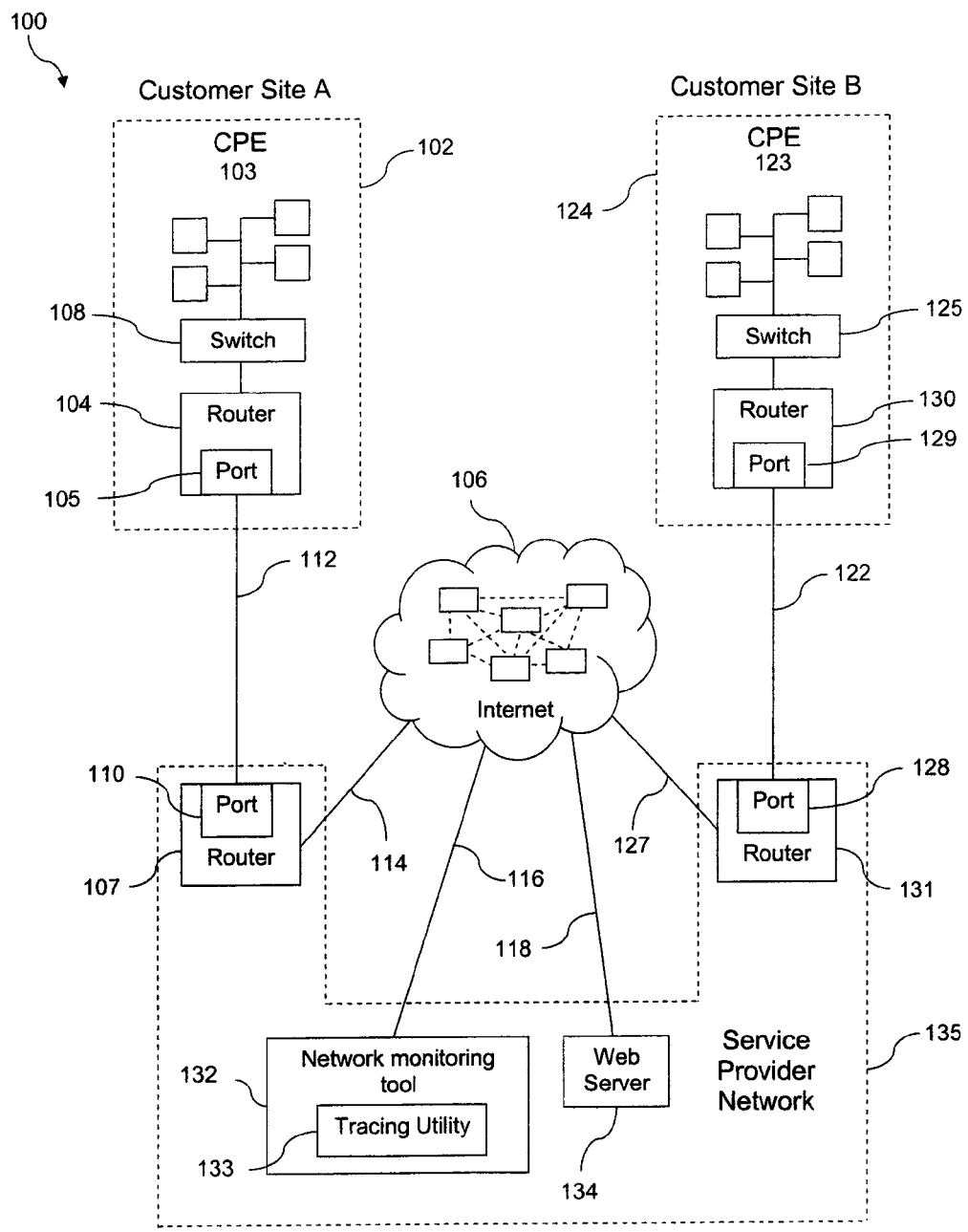
FIG. 1 is an illustration of a communication network monitoring system for implementing several embodiments of the disclosure.

Turning now to FIG. 1, a system 100 is described. The system 100 comprises a customer site A with a network 102. The network 102 comprises customer premises equipment (CPE) 103, which comprises a plurality of computers, a switch 108, a customer edge router 104, and a customer edge port 105. In an embodiment, the switch 108 may be a specialized switching system or apparatus to direct communications traffic, and may control the flow of data packets from the plurality of computers of the CPE 103 to the customer edge router 104. In an embodiment, the customer edge port 105 may comprise a plurality of ports, and may comprise additional connections which may be to other networks and/or other service provider networks.

The system 100 also includes a similar arrangement for a customer site B. Customer site B comprises a network 124. Network 124 comprises a CPE 123, which comprises a plurality of computers, a switch 125, a customer edge router 130, and a customer edge port 129. The customer site A and the customer site B may represent two locations of the same enterprise or business that may be proximate to one another or may be separated by substantial distance. The network 102 at customer site A and the network 124 at customer site B may be linked to facilitate communicate between one another, via the Internet 106.

The communication service for the network 102 may be provided, in part, by a communication link 112. In an embodiment, the link 112 may be from the CPE 103, via the switch 108, the customer edge router 104, a customer edge port 105, to a provider edge port 110, and to a provider edge router 107. The provider edge router 107 may provide access to the Internet 106 via a link 114. Thus, the CPE 103 may access the Internet 106 for, as an example, accessing content from a content server (not shown) via the switch 108, the customer edge router 104, the customer edge port 105, the link 112, the provider edge port 110, the provider edge router 107, and the link 114, where the content server (not shown) is connected to the Internet 106.

Communication service for customer site B network 124 may be provided, in part, by a communication link 122. In an embodiment, the link 122 may be from the CPE 123 via the switch 125 and the customer edge router 130, the customer edge port 129, to the provider edge port 128 and the provider edge router 131. The connection to the Internet 106 may be from the provider edge router 131, via the link 127 to the Internet 106.

The system 100 also comprises a service provider network 135. The service provider network 135 comprises the provider edge port 110 and the provider edge router 107, as well as the provider edge port 128 and the provider edge router 131, all of which are described above. In addition, the service provider network 135 comprises a web server 134 and a network monitoring tool 132. The communication service of the service provider network 135 may include one or more of VPN service, email service, multimedia communication service, video conference service, voice communication service, frame relay service, data communication service, and other communication services. In an embodiment, the provider edge routers 107, 131 may be implemented by a computer system provided with software and interfaces that facilitate receiving and forwarding of data packets. Computer systems are discussed in greater detail hereinafter. In an embodiment, the receiving and forwarding of data packets may be referred to as routing.

Also illustrated in system 100 is a depiction of the Internet 106, comprising a plurality of devices such as routers, servers, computers, and/or other devices. One skilled in the art may realize that the plurality of devices of the Internet 106 may be interconnected, either physically or via wireless communication (not shown) to provide paths for communications to travel from one location to another over the Internet 106. The dotted lines between these devices indicate that the connections may be dynamic and the associated paths from one point to another may change from time-to-time. Path changes may be the result of individual devices becoming overloaded, disabled, or otherwise unavailable to transmit data packets via the Internet 106. While an exemplary interconnectivity mesh is illustrated among the plurality of devices of the Internet 106, for example routers, it is understood that other connectivity meshes among the devices of the Internet 106 are also within the spirit of the present disclosure. When a device becomes unavailable, the data packets may be rerouted through an alternate path to the destination.

In some embodiments, the provider edge routers 107, 131 may contain a specialized operating system, such as the IOS, the JUNOS, or the XOS operating systems. In other embodiments, the provider edge routers 107, 131 may employ general purpose operating systems such as the UNIX, the LINUX, or the WINDOWS operating systems. In some embodiments, the provider edge routers 107, 131 may be referred to as network switches, layer 3 switches, provider edge switches, or switches. The provider edge routers 107, 131 may support many communication protocols, including Internet protocol (IP), multi protocol label switching (MPLS), asynchronous transfer mode (ATM), and/or others. The provider edge routers 107, 131 may range in capacity from small to large traffic handling capability. While shown in FIG. 1 as outside of the cloud representing the Internet 106, the provider edge routers 107, 131 may be considered inside the cloud of the Internet 106. It is well known that routers, for example, provider edge routers 107, 131 make up a substantial portion of the nodes considered within the cloud of the Internet 106.

In an embodiment, the connection from network 102 at customer site A to the Internet 106, and the connection from network 124 at customer site B to the Internet 106, through the devices and links described above, may facilitate secure communications via a VPN between the two customer sites across the Internet 106. The switches, routers, and links comprising the network 102, the network 124, and the service provider network 135 described above may be the same or similar in a plurality of communication scenarios between the network 102 at customer site A to the network 124 at customer site B. However, the path across the Internet 106 that may connect the customer site A network 102 to the customer site B network 124 may proceed via a different path at any time, as the availability of devices and links traversed while crossing the Internet 106 may vary.

In an embodiment, the network monitoring tool 132 may comprise a tracing utility 133. The tracing utility 133 may be one of traceroute, traceroute6, layer four traceroute, TCPtraceroute, tracecert, MTR, PathPing, or other utility program or tool for determining packet routes and/or other packet transport metrics. The tracing utility 133 selected for use with the network monitoring tool 132 may be determined, at least in part, by the operating system of the system 100 such as the UNIX, the Linux, one of a plurality of versions of the MS Windows, or other operating systems. In an embodiment, the tracing utility 133 may be part of an operating system such as FreeBSD, NetBSD, OpenBSD, DragonFly BSD, Mac OS X, or other operating systems.

The network monitoring tool 132 may use the tracing utility 133 to identify a plurality of routers traversed by data packets as they travel from one location to another, for example, from customer site A network 102 to customer site B network 124. The network monitoring tool 132 may further use the information returned by the tracing utility 133 to determine a performance of each router that the data packets traverse. Performance metrics may include, but may not be limited to, latency, jitter, queue overflow, bit error, and data packet loss. These metrics may be factors that affect quality of service and may be part of an SLA. In an embodiment, the network monitoring tool 132 may be implemented as a computer system. Computer systems are discussed further hereinafter. In an embodiment, the tracing may analyze the transmission of data packets from customer site A network 102 to customer site B network 124 and may analyze the transmission of data packets from the customer site B network 124 in a return message back to customer site A network 102. In an embodiment, the tracing may further analyze the transmission of data packets from customer site B network 124 to customer site A network 102 and may analyze the transmission of data from customer site A network 102 in a return message back to the customer site B network 124.

In an embodiment, the tracing utility 133 may send a packet or packets of data configured to allow the routers to return details of the packet handling. The details may include the identity of the routers that handle the packets, the timestamp values returned from the routers as the packets are handled by the routers, and/or other router data packet handling information. The details of the routers that the packets traverse may be returned to the network monitoring tool 132 by the tracing utility 133 in a simple text format or other data format.

The information returned to the network monitoring tool 132 by the tracing utility 133 may be used to determine details of the routing of packets, in terms of the routers that the packets encounter, as well as the time-delay the packets experience at each router. In an embodiment, the time-delay encountered by the packets may be referred to as latency. Latency values may be reported by the tracing utility 133 in time increments such as milliseconds (ms), and may be on the order of about 5 ms, about 25 ms, about 100 ms, or other amount of time. In an embodiment, the network monitoring tool 132 may log data of network latency and may determine an average or a mean latency for the network. This average or mean network latency may be used to determine a typical and/or an acceptable latency level.

In an embodiment, the network monitoring tool 132 may also use the information provided by the tracing utility 133 to determine a level of network jitter. Network jitter may be referred to as packet delay variation (PDV), and may be a factor of quality of service. Packet delay variation may be defined as the variation in the latency associated with packet transport. For instance, if packet transmission from one location to another experiences a network latency of, for example, 50 ms, but over a period of time the network latency remains constant, the network may be may be considered to have low packet delay variation. Low packet delay variation may be an aspect of high quality of service for a user of the network. Packet delay variation may be expressed as an average of the deviation from the network mean latency. Typical values for packet delay variation may be on the order of about 1 ms, about 5 ms, about 20 ms, or other value.

In addition, the tracing utility 133 may provide the network monitoring tool 132 with information regarding queue overflow issues between routers. Queue overflow may result when, for instance, a first router forwards data packets to a second router faster than the second router can receive and transmit them. In this instance, the queue of the second router may become overloaded and may not be able to accept additional data packets from the first router, and may drop or reject some data packets. Queue overflow may result in data packet transport delays, data packet loss, and/or other issues that may negatively affect data packet transmission across a network.

Bit error may be another parameter measured by the tracing utility 133. In an embodiment, bit error may be referred to as bit error rate (BER), and may be the result of noise or other negative result of network data transmission. Bit error rate may be the ratio of the number of bits that fail to transmit properly to the number of bits that are transmitted properly. As with other network data package transport metrics, bit error rate may affect quality of service or other specifications of an SLA agreement.

The tracing utility 133 may further provide the network monitoring tool 132 with information about data packet loss. Data packet loss may occur when one or more packets of data traversing a network, such as the Internet 106, fail to reach their destination. Data packet loss may occur for a variety of reasons, such as overloading of routers or other data handling components of the Internet 106, corrupted data packet rejection, signal degradation, or other issues that may result in data packet loss. Data packet loss may be another factor that negatively affects quality of service.

In an embodiment, the service provider network 135 may provide a customer, such as a customer that has multiple sites, with access to the network monitoring tool 132 as part of an SLA. User access may be provided via a web interface or by another interface. The customer may use the network monitoring tool 132 to monitor the total network quality (TNQ) of the network services provided by the service provider network 135 in an end-to-end manner. The network monitoring tool 132 may be configured to monitor data packet transmission from one customer site to another, for example from the network 102 at customer site A to customer site B network 124, and/or any number of other customer sites. The network monitoring tool 132 may further be configured to provide network metrics to the customer and/or to the service provider network 135, and the network metrics may be used to determine a TNQ that may be specified in an SLA. In an embodiment, the network monitoring tool 132 may promote monitoring of a plurality of CPE's and/or a plurality of customers concurrently.

In another embodiment, the network monitoring tool 132 may log network metrics that may facilitate a customer determining whether or not they are efficiently utilizing their network communication equipment and/or service. The customer may analyze the logged metrics using the network monitoring tool 132 and may use the analysis to make adjustments to their system settings to more efficiently utilize their available bandwidth. For instance, the customer may delay or defer expenditures for additional services and/or equipment by modifying the class of service settings of their system and/or the class of service settings of the edge routers of the service provider network 135. This may allow the customer to modify packet handling to prioritize certain packets or classes of communications in order to increase system efficiency without incurring costs.

In an embodiment, the network monitoring tool 132 may provide real-time monitoring of network status. For the purposes of the present disclosure, the term real-time may be associated with an update rate of about one minute, about 2 minutes, about 5 minutes, about 15 minutes, or other period of time. The network monitoring tool 132 may perform continuous checks by conducting monitoring of data packet transmission continuously to provide real-time reporting of network communication system status. The network monitoring tool 132 may be configured to perform routine checks and log network performance for subsequent analysis and/or tracking. The network monitoring tool 132 may be configured to perform routine checks about hourly, about daily, about weekly, or other period of time. The log file may be made available to the customer and/or to the service provider. The network monitoring tool 132 may initiate network performance determinations based on time, system availability, special requests from the customer or the service provider network 135, or other triggering method in order to provide information to assess network performance.

In an embodiment, the network monitoring tool 132 may also be configured to provide an alert when network issues arise. For example, when the network monitoring tool 132 discovers an issue with data packet transmission or another aspect of network communication, it may notify an agent of the customer or an agent of the service provider network 135 of the issue. A notification may be one or more of an email message, an icon on a network monitoring terminal, a flashing display on a monitor, or other form of notification that network communications may have an issue or issues that may require attention.

In another embodiment, the network monitoring tool 132 may be configured to analyze historical network performance and provide predictions of network issues. For instance, the network monitoring tool 132 may determine, via extrapolating historical data, that a particular router of the Internet 106 may be subject to queue overflow on a particular day of the week. The network monitoring tool 132 may then configure the customer's network traffic to avoid this router during a period of time that has been determined to have issues for data communication. This process may further enhance the user experience of the network by avoiding delays, data loss, system downtime, or other issues that may negatively affect the customer and/or may be covered within an SLA. In an embodiment, the network monitoring tool 132 may be configured to provide predictive, preemptive, and/or diagnostic services for a customer or for the service provider network 135.

In an embodiment, the network monitoring tool 132 may provide a customer with the ability to diagnose their own network issues and may thereby avoid service calls and/or trouble tickets submitted to the service provider. The network monitoring tool 132 may be configured to give the customer the ability to visualize network issues, and may further allow the customer to diagnose and repair or avoid issues at a customer site or other location. In this manner, the customer may increase the system efficiency and/or uptime. By monitoring network communication between the plurality of customer sites and identifying communication issues, the customer may be able to provide a level of self-support that may result in lower cost of ownership of the communication system 100. This customer self-support may allow the service provider to realize reduced costs for operating and/or maintaining the system 100, and may thereby allow the service provider to pass cost savings along to customers. This ability to pass along cost savings to the customer may give the service provider an increased competitive advantage over other service providers. For additional details about VPNs, SLAB, and quality of service, see U.S. patent application Ser. No. 11/838,175 filed Aug. 13, 2007, entitled "Network Access and Quality of Service Troubleshooting," by Jose A. Gonzalez et al, which is hereby incorporated by reference and U.S. patent application Ser. No. 12/036,289 filed Feb. 24, 2008, entitled "Flexible Grouping for Port Analysis," by David M. Ham et al, which is hereby incorporated reference.

In an embodiment, the network monitoring tool 132 may comprise a view restriction mechanism that provides the ability to configure a portion or portions the system 100 to restrict certain end users from accessing or viewing some aspects of the system 100, such as specific devices, ports, and/or features of the system 100. The customer may selectively provide access to some areas and/or features of the system to end users, in order to help prevent unauthorized use or changes to the system 100. For example, high-level operators and/or technicians may be given higher levels of access than some end users in order to facilitate system operation and/or maintenance, as well as to prevent system tampering or inadvertent system changes by unqualified personnel.

The network monitoring tool 132 may provide the ability to suppress alarms and/or service ticket generation for preventing unwanted alarms or ticket generation during maintenance procedures. For example, if a customer is performing routine scheduled system maintenance, and they do not want the network monitoring tool 132 to detect the actions as system malfunctions and thereby issue service tickets or setoff alarms while maintenance is underway, the customer may disable a portion or portions of the network monitoring tool 132. The customer may then be permitted to subsequently re-enable these portions of the network monitoring 132 tool when maintenance is completed. The ability to suppress alarms may also help prevent the misleading skewing of statistical communication error rates, where the communication errors may not be indicative of communication infrastructure problems but instead may be caused by the subject equipment having been deliberately placed into a maintenance mode of operation.

Figure 2:
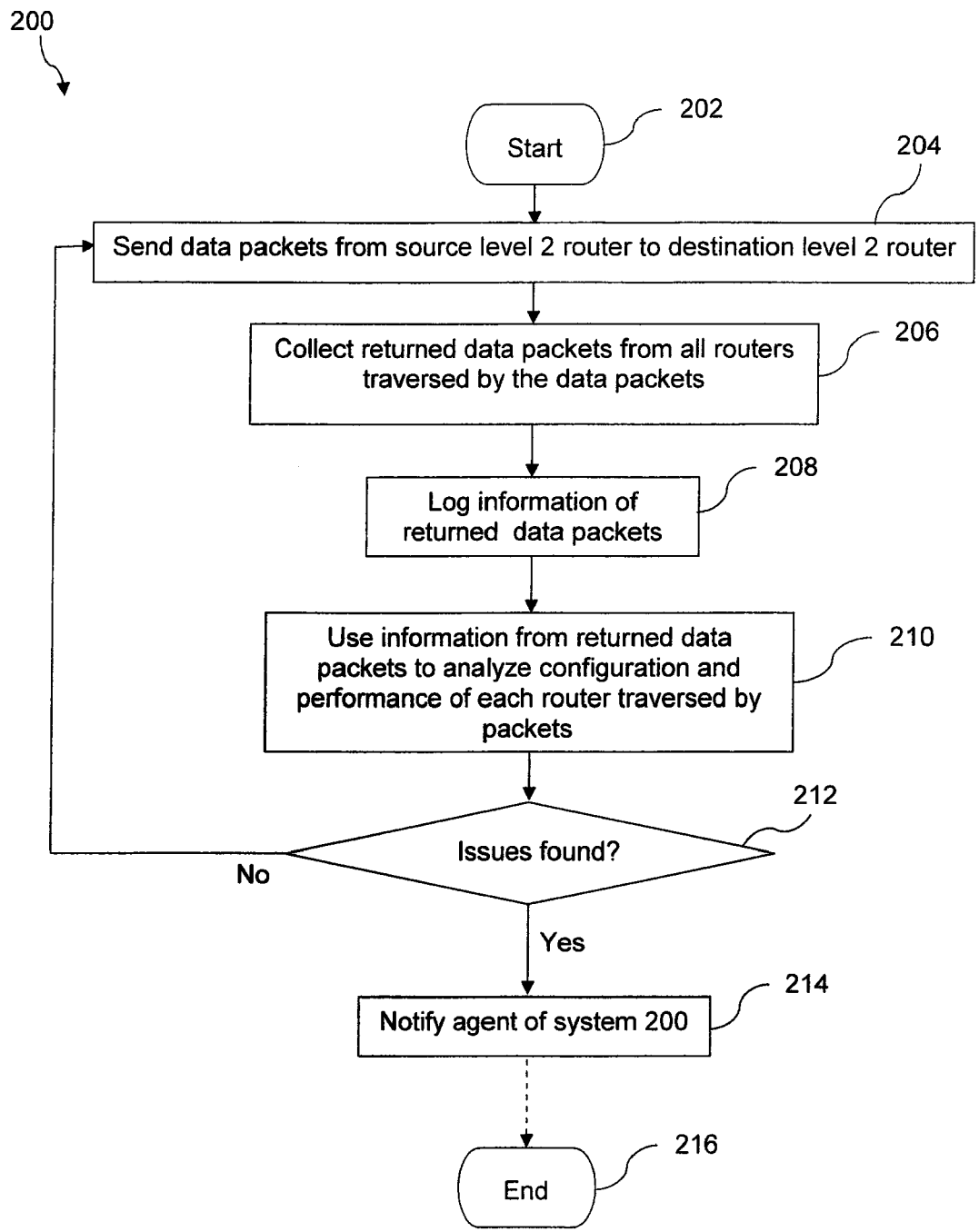
FIG. 2 is a flowchart of a method of monitoring a communication network according to an embodiment of the disclosure.

FIG. 2 illustrates a flowchart of a method 200 as an example of monitoring a communication network. At block 202, method 200 may start. At block 204, the method 200 may send three data packets with a time-to-live (TTL) value of 1 from a source customer edge router at a first customer site to a destination customer edge router at a second customer site. When the packets leave the source customer edge router, they may be routed to a first router. At block 206, the first router may then receive the first of the three data packets and, due to the time-to-live value of 1, may discard the first packet and return an Internet control message protocol (ICMP) type 11 packet back to the sender, e.g. the source customer edge router. The first router may then receive the second data packet and handle it in the same manner as the first data packet. It may then handle the third packet in the same manner. The first router may thereby receive the three packets and subsequently return three corresponding ICMP type 11 data packets to the source customer edge router, each with a timestamp value associated with the handling of each of the data packets.

The method 200 may then send a second set of three data packets from the source customer edge router to the destination customer edge router. The second set of three data packets may be given a time-to-live value of 2. The data packets may be routed to a first router that may decrement the time-to-live value of each of the three data packets from 2 to 1, and forward them to a second router. The second router may then receive the three data packets that now have a time-to-live value of 1 from the first router. The second router may then discard the first data packet and return an ICMP type 11 packet to the source customer edge router, via the first router, as before. The second router may then receive the two remaining data packets and subsequently return two corresponding ICMP type 11 data packets to the source customer edge router, as before. The method 200 may repeat the process of sending sets of three data packets, each set of which may have successively higher integer time-to-live values, until the all of the routers between the source customer edge router and the destination customer edge router have been traversed and the destination customer edge router at the second customer site has been reached.

At block 208, the method 200 may log the information of the returned ICMP type 11 data packets. At block 210, the method 200 may use the ICMP type 11 data packets that have been returned from each of the routers and may produce a list of the identity of each router traversed by the data packets. In addition, the timestamps associated with each of the returned ICMP type 11 data packets may be analyzed to determine a performance of each of the routers traversed by the data packets. If, at block 212 any issues have been identified with any of the routers traversed by the data packets, the method 200 may notify an agent of the communication system at block 214. At block 216, the agent of the communication system may then end the method 200, or alternatively may continue the method 200, as the situation may suggest.

In this example, the method 200 may continuously monitor the communication system by repeating the steps of the method 200 without a delay. In an embodiment, the method 200 may repeat at an interval determined by an agent of the system, where the interval may be one or more of time, system status, system activity, or other form of triggering event. In an embodiment, the method 200 may be initiated with a time interval of about hourly, about daily, about weekly, or other time period. In an embodiment, the network monitoring tool 132 may be configured to execute system monitoring steps based on system activity, wherein a pre-determined level of inactivity may trigger the method 200. In an embodiment, the pre-determined level of inactivity may be one of no data packets sent or received for a period of about 1 minute, about 5 minutes, about 15 minutes, or other. In an embodiment, the method may be configured to continuously execute when no additional system activity is detected.

Figure 3:
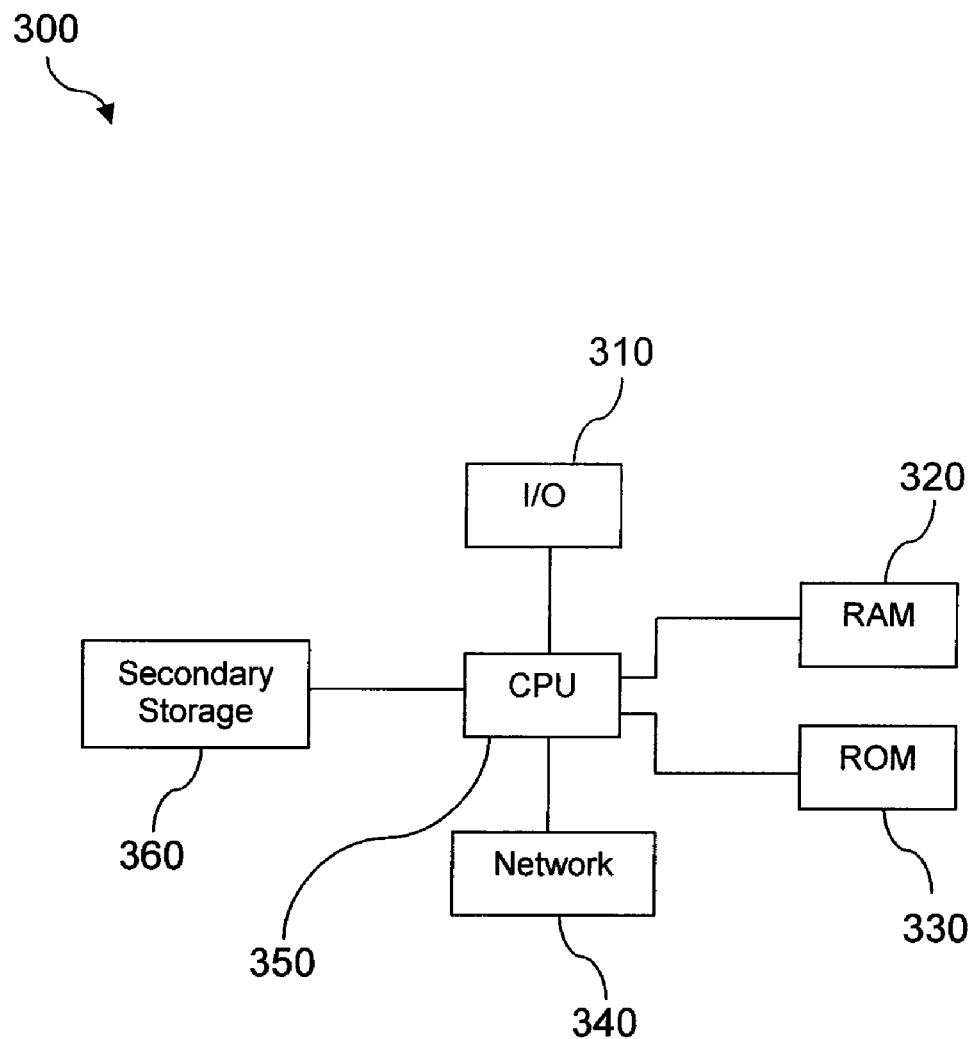
FIG. 3 illustrates an exemplary computer system suitable for implementing aspects of the several embodiments of the disclosure.

FIG. 3 illustrates a computer system 300 suitable for implementing one or more aspects of the embodiments disclosed herein. The computer system 300 includes a processor 350 (which may be referred to as a central processor unit or CPU) that is in communication with memory devices including secondary storage 360, read only memory (ROM) 330, random access memory (RAM) 320, input/output (I/O) devices 310, and network connectivity devices 340. The processor 350 may be implemented as one or more CPU chips.

It is understood that by programming and/or loading executable instructions onto the computer system 300, at least one of the CPU 350, the RAM 320, and the ROM 330 are changed, transforming the computer system 300 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 360 is typically comprised of one or more disk drives or tape drives and is used for non-volatile storage of data and as an over-flow data storage device if RAM 320 is not large enough to hold all working data. Secondary storage 360 may be used to store programs which are loaded into RAM 320 when such programs are selected for execution. The ROM 330 is used to store instructions and perhaps data which are read during program execution. ROM 330 is a non-volatile memory device which typically has a small memory capacity relative to the larger memory capacity of secondary storage 360. The RAM 320 is used to store volatile data and perhaps to store instructions. Access to both ROM 330 and RAM 320 is typically faster than to secondary storage 360.

I/O devices 310 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 340 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 340 may enable the processor 350 to communicate with an Internet or one or more intranets. With such a network connection, it is contemplated that the processor 350 might receive information from the network, or might output information to the network in the course of performing the above-described method steps. Such information, which is often represented as a sequence of instructions to be executed using processor 350, may be received from and outputted to the network, for example, in the form of a computer data signal embodied in a carrier wave.

Such information, which may include data or instructions to be executed using processor 350 for example, may be received from and outputted to the network, for example, in the form of a computer data baseband signal or signal embodied in a carrier wave. The baseband signal or signal embodied in the carrier wave generated by the network connectivity devices 340 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The processor 350 executes instructions, codes, computer programs, scripts which it accesses from hard disk, floppy disk, optical disk (these various disk based systems may all be considered secondary storage 360), ROM 330, RAM 320, or the network connectivity devices 340. While only one processor 350 is shown, multiple processors may be present. Thus, while instructions may be discussed as executed by a processor, the instructions may be executed simultaneously, serially, or otherwise executed by one or multiple processors.

In an embodiment, the computer system 300 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 300 to provide the functionality of a number of servers that is not directly bound to the number of computers in the computer system 300. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by a business and/or may be hired on an as-needed basis from a third party provider. Some cloud computing environments may comprise cloud computing resources owned and operated by the business as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 300, at least portions of the contents of the computer program product to the secondary storage 360, to the ROM 330, to the RAM 320, and/or to other non-volatile memory and volatile memory of the computer system 300. The processor 350 may process the executable instructions and/or data in part by directly accessing the computer program product, for example by reading from a CD-ROM disk inserted into a disk drive peripheral of the computer system 300. The computer program product may comprise instructions that promote the loading and/or copying of data, data structures, files, and/or executable instructions to the secondary storage 360, to the ROM 330, to the RAM 320, and/or to other non-volatile memory and volatile memory of the computer system 300.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A communication network monitoring system, comprising:
   a computer having a processor and a memory; and
   an application stored in the memory that, when executed by the processor,
      identifies a plurality of routers traversed by data packets sent from a source customer edge router to a destination customer edge router, wherein the source customer edge router and the destination customer edge router are associated with a customer,
      determines a performance of each of the identified routers with reference to their transport of the data packets sent from the source customer edge router to the destination customer edge router,
      identifies a configuration of the source customer edge router,
      determines a performance of the source customer edge router,
      identifies a configuration of the destination customer edge router,
      determines a performance of the destination customer edge router, wherein the performance of at least one of the source customer edge router and the destination customer edge router comprises a packet queue overflow status,
      analyzes the performance of each of the identified routers, the performance of the source customer edge router, the performance of the destination customer edge router, the configuration of the source customer edge router, and the configuration of the destination customer edge router, and
      based on the analysis, outputs to the customer at least one of a diagnosis of a source of a communication problem associated with data packets sent from the source customer edge router to the destination customer edge router and a recommendation of a change in the configuration of at least one of the source customer edge router and the destination customer edge router.

2. The system of claim 1, wherein the computer is a router.

3. The system of claim 1, wherein the performance of the routers comprises information about at least one of an average jitter, an average latency, and a packet error rate.

4. The system of claim 1, wherein the sending of the data packets from the source customer edge router to the destination customer edge router is sent using a multiprotocol label switching (MPLS) virtual private network (VPN) service.

5. The system of claim 1, wherein the plurality of routers traversed by the data packets sent from the source customer edge router to the destination router are identified using a traceroute utility.

6. A method of monitoring a communication network, comprising:
   identifying a plurality of routers traversed by data packets sent from a source customer edge router to a destination customer edge router, wherein the source customer edge router and the destination customer edge router are associated with a customer;
   determining a performance of each of the routers with reference to their transport of the data packets sent from the source customer edge router to the destination customer edge router;
   identifying a configuration of the source customer edge router;
   determining a performance of the source customer edge router;
   identifying a configuration of the destination customer edge router;
   determining a performance of the destination customer edge router, wherein the performance of at least one of the source customer edge router and the destination customer edge router comprises a packet queue overflow status;
   analyzing the performance of each of the identified routers, the performance of the source customer edge router, the performance of the destination customer edge router, the configuration of the source customer edge router, and the configuration of the destination customer edge router; and
   based on the analyzing, outputting to the customer at least one of a diagnosis of a source of a communication problem associated with data packets sent from the source customer edge router to the destination customer edge router and a recommendation of a change in the configuration of at least one of the source customer edge router and the destination customer edge router.

7. The method of claim 6, wherein the performance of the routers comprises information about at least one of an average jitter, an average latency, and a packet error rate.

8. The method of claim 6, wherein the data packets sent from the source customer edge router to the destination customer edge router traverse the plurality of routers using a multiprotocol label switching (MPLS) virtual private network (VPN) service.

9. The method of claim 6, wherein the source customer edge router is a customer premises equipment and where the method further comprises identifying a configuration of a first switch coupled to the source customer edge router and determining a performance of the first switch, wherein the first switch is a customer premises equipment and wherein analyzing further comprises analyzing the performance of the first switch.

10. The method of claim 9, wherein the destination customer edge router is a customer premises equipment and where the method further comprises identifying a configuration of a second switch coupled to the destination customer edge router and determining a performance of the second switch, wherein the second switch is a customer premises equipment and wherein analyzing further comprises analyzing the performance of the second switch.

11. The method of claim 6, wherein identifying the plurality of routers traversed by the data packets sent from the source customer edge router to the destination customer edge router comprises executing a traceroute command.

12. A communication network monitoring system, comprising:
a computer having a processor and a memory; and
an application stored in the memory that, when executed by the processor,
identifies a plurality of routers traversed by data packets sent from a source customer edge router to a destination customer edge router, wherein the source customer edge router and the destination customer edge router are associated with a customer,
determines a performance of each of the identified routers with reference to their transport of the data packets sent from the source customer edge router to the destination customer edge router at a plurality of times, wherein the performance of at least one of the source customer edge router and the destination customer edge router comprises a packet queue overflow status,
builds a history of the performance of each of the identified routers,
identifies a configuration of the source customer edge router,
determines a performance of the source customer edge router at a plurality of times,
builds a history of the performance of the source customer edge router,
identifies a configuration of the destination customer edge router,
determines a performance of the destination customer edge router at a plurality of times,
builds a history of the performance of the destination customer edge router,
analyzes the history of the performance of each of the identified routers, the history of the performance of the source customer edge router, the history of the performance of the destination customer edge router, the configuration of the source customer edge router, and the configuration of the destination customer edge router, and
based on the analysis, outputting to the customer at least one of a diagnosis of a source of a communication problem associated with data packets sent from the source customer edge router to the destination customer edge router and a recommendation of a change in the configuration of at least one of the source customer edge router and the destination customer edge router.

13. The system of claim 12, wherein the computer is a router.

14. The system of claim 12, wherein the application further redirects the data packets sent from the source customer edge router to the destination customer edge router via a different transport path.

15. The system of claim 12, wherein the performance of the routers comprises information about at least one of an average jitter, an average latency, and a packet error rate.

16. The system of claim 12, wherein the sending of the data packets from the source customer edge router to the destination customer edge router is sent using a multiprotocol label switching (MPLS) virtual private network (VPN) service.

17. The system of claim 12, wherein the plurality of routers traversed by data packets sent by the source customer edge router to the destination customer edge router are identified using a traceroute utility.

* * * * *